Jan. 19, 1932.  J. WILLIAMS  1,841,772
PISTON AND RING ASSEMBLY
Filed Dec. 3, 1927
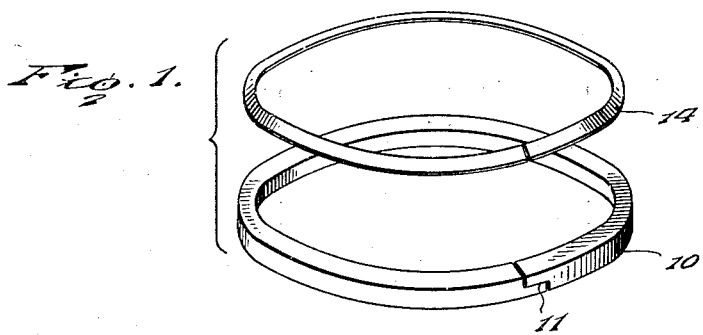
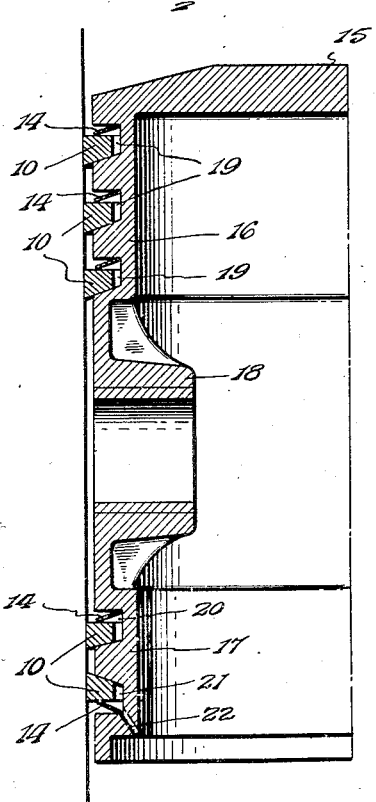
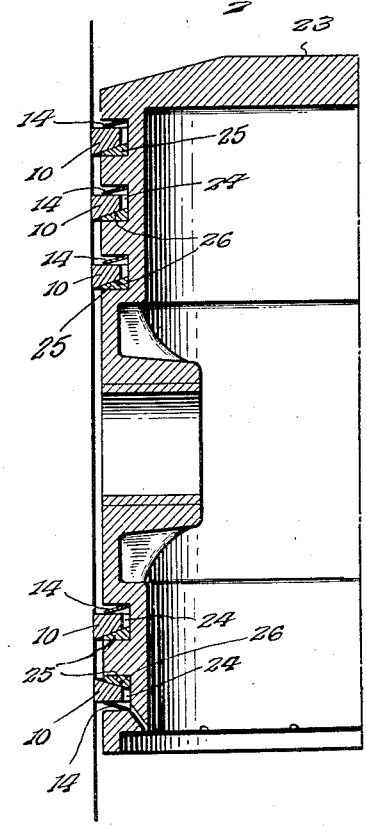
Inventor
Judson Williams.
By Lacey & Lacey, Attorneys Patented Jan. 19, 1932

1,841,772

UNITED STATES PATENT OFFICE

JUDSON WILLIAMS, OF PHILADELPHIA, PENNSYLVANIA

PISTON AND RING ASSEMBLY

Application filed December 3, 1927. Serial No. 237,453.

This invention relates to an improved piston ring and piston assembly and seeks, among other objects, to provide an assembly wherein, for any given cylinder, the piston will be sufficiently undersize to more than allow for the maximum thermal expansion of the piston under working conditions so that at no time will the piston contact the wall of the cylinder while, however, the piston will be firmly centered within the cylinder and rigidly held against rocking or canting movement.

A further object of the invention in this connection is to provide an assembly wherein the piston will, throughout its entire length, be at all times out of contact with the cylinder wall while, however, the piston will be rigidly supported near its upper end in centered position within the cylinder and will also be rigidly supported near its lower end in centered position within the cylinder so that canting of the piston will be effectually precluded.

A still further object of the invention is to provide an assembly wherein the centering and supporting of the piston in centered position within the cylinder will be accomplished through the medium of the piston rings while, however, mechanical friction will, as compared with the use of ordinary rings, be materially reduced.

And the invention seeks as a still further object to provide an assembly embodying a novel mounting for the piston ring as well as a novel tensioning element therefor.

Other objects of the invention not specifically mentioned in the foregoing will appear during the course of the following description.

In the drawings,

Figure 1 is a perspective view showing a typical ring member and its tensioning element, Figure 2 is a fragmentary perspective view showing the joint between the ends of the ring member, Figure 3 is a fragmentary vertical sectional view showing a piston and ring assembly within a cylinder, and Figure 4 is a view similar to Figure 3 showing a slight modification of the invention.

In carrying the invention into effect I employ a split resilient ring member 10 which may be formed with a lap joint as indicated at 11 and, as seen in Figure 2, the ring member is provided with a beveled lower face 12, said member being thicker at its outer circumference than at its inner circumference. As further particularly illustrated in Figure 2, the beveled face 12 extends across the tongues of the joint 11 to provide beveled lands 13 at said tongues, the inclination of the lands conforming, of course, to the inclination of the face 12.

In conjunction with the ring member 10 I provide a split annular tensioning element or ring 14. This element 14 is formed of cast iron so as to effectually withstand the heat incident to the working conditions of a piston and is frusto-conical in shape.

In Figure 3 I have shown a piston having a head 15, trunk 16 and skirt 17, as well as alined wrist pin bearings one of which is shown at 18. Encircling the piston near its upper end are ring grooves 19, while the skirt is provided with spaced grooves 20 and 21, the latter groove having drain passages 22 leading therefrom. The grooves 19 and 20 are alike and are provided with flat top walls lying in planes at right angles to the axis of the piston. However, the bottom walls of said grooves are beveled and incline downwardly and outwardly to the periphery of the piston. The groove 21 is provided with a flat bottom wall and inclined top wall. Fitting in each of the grooves 19 and 20 and 21 is one of the ring members 10, the beveled face of which is inclined to conform to the inclination of the beveled walls of said grooves. Coacting with each of the ring members and housed within the ring grooves respectively is one of the tensioning elements 14. Those of the elements 14 which occupy the grooves 19 and 20 are disposed above the ring members in such grooves for pressing these ring members downwardly while the element 14 in the lowermost groove 21 is disposed below the ring member in this latter groove for pressing such ring member upwardly. The ring member in the bottom groove is inverted to provide an oil wipe.

As initially installed, the ring members 10 may, if desired, be tensioned against the cylinder wall by the expansion of said members. However, it is preferable that these members shall, as initially installed, be substantially inert. In other words, the ring members will fit loosely within the ring grooves and will of their own expansive action have little or no tension against the cylinder wall indicated by the vertical line at the left of Figure 3. In this connection it is to be observed that the piston throughout its length is under-cylinder size and the clearance between the piston and cylinder wall is more than sufficient to accommodate the maximum thermal expansion of the piston so that at no time will the piston frictionally engage the cylinder wall.

Attention is now particularly directed to the fact that the confining of the ring members 10 within the ring grooves of the piston by the cylinder wall, causes the tensioning elements 14 to be brought under tension. As shown in Figure 3, the inner edges of these elements hug the bottom walls of the grooves while the outer edges of said elements rest on the ring members. Consequently, the ring members when confined by the cylinder wall and thus contracted will move into the grooves. As a result, the inclined bottom faces 12 of said members are caused to ride up the inclined walls of the grooves for compressing the elements 14 between said members and the flat walls of the grooves with the resultant tensioning of said elements, the tendency of the inward or contractive movement of the ring members being to flatten the tensioning elements. The elements 14 will thus constantly press the ring members downwardly against the inclined walls of the ring grooves. The inclined faces 12 of the ring will therefore coact with these walls for expanding the ring members to firmly engage at their outer peripheries with the wall of the cylinder.

Since the ring members 10 are substantially inert initially, as previously described, said members will, under the pressure of the tensioning elements 14, be expanded equally in all directions so that the piston will be accurately centered within the cylinder. However, since the pressure of the elements 14 is exerted in the direction of the inclined walls of the ring grooves, the radial outward pressure of the ring members against the cylinder wall will, as will be appreciated, be materially less than the pressure exerted on the ring members by said elements. As result, mechanical friction between the ring members and the cylinder wall is reduced to a minimum and is far less than would be experienced with a like number of ordinary radially expansive rings.

It is now to be noted that the ring members 10 will not only have constant metal to metal contact at their outer peripheries with the cylinder wall but will also have constant metal to metal contact at their lower beveled faces 12 with the inclined walls of the ring grooves. Therefore, any force tending to cant or rock the piston will be communicated through the inclined walls of the ring grooves and through the beveled faces of the ring members to the cylinder wall. Rocking or canting movement of the piston can thus be accomplished only by overcoming the tension of the elements 14 and since a very large portion of the canting thrust exerted on the piston will be communicated through the ring members directly to the cylinder wall, the tension of the elements 14 is amply sufficient to resist the remaining thrust tending to rock the piston relative to the rings. The piston is, as a consequence, therefore not only centered within the cylinder but is amply supported by the ring members and tensioning elements against canting movement and to all intents and purposes, the piston is rigidly supported against such canting movement.

The three rings near the upper end of the piston support and guide the upper end of the piston while the two rings on the skirt of the piston support and guide the piston near its lower end. The piston is therefore to all intents and purposes rigidly sustained and centered both above and below the wrist pin bearings. For such reason it is unnecessary that the piston at any point shall frictionally contact the cylinder wall since canting of the piston is effectually prevented. Since the ring members are expanded substantially equally in all directions, said members will each provide an unusually effective seal between the piston and cylinder wall and since the lands 13 at the ends of the ring members 10 will lie flat against the beveled walls of the ring grooves at the joints between the ends of the ring members, said lands will co-operate with the beveled walls of the ring grooves to form a seal at each of said joints so that compression cannot enter behind the ring members to escape past the rings at the joints.

In Figure 4 of the drawings I have illustrated a slight modification of the invention especially designed for use in connection with pistons having ring grooves provided with flat top and bottom walls. In this figure of the drawings a portion of a piston is shown at 23, and formed in the piston are ring grooves 24 having parallel flat top and bottom walls, the grooves being spaced longitudinally of the piston in the same manner as the grooves 19, 20 and 21. Removably fitting in the grooves 24 are split resilient wedging rings 25. Thus rings are provided at corresponding sides thereof with flat faces to seat flat within the grooves and at their opposite corresponding sides with beveled faces 26 inclined to conform to the inclination of the beveled faces 12 of the ring members 10. Thus, the wedging rings 25 will coact with said members for expanding the ring members under the pressure of the tensioning elements 14. Otherwise, this modification of the invention is identical with the preferred embodiment thereof and further description is accordingly believed unnecessary.

Having thus described the invention, what I claim is:

1. A piston having an annular groove having an inner wall and opposed straight and beveled side walls, a piston ring in the groove split transversely from inner edge to outer edge having flat and beveled faces, and an inclined tension ring in said groove engaged with the inner wall of the groove and with the flat face of the piston ring for holding the beveled face of the piston ring in intimate sliding engagement with the beveled side wall of the groove.

2. A piston having an annular groove provided with an inner wall and opposed straight and beveled side walls, a piston ring engaged in the groove and having beveled and straight faces, the beveled face of the piston ring bearing against the beveled side wall of the groove, and a tension ring frusto-conical in shape and split transversely from edge to edge engaged in the groove between the piston ring and straight side wall of the groove and bearing against the flat face of the piston ring to hold the beveled face of the piston ring in tight engagement with the beveled side wall of the groove.

3. A piston ring and follower assembly comprising a cast iron piston ring having a joint, and a thin frusto-conical cast iron follower ring engaging one face of said piston ring and adapted to be compressed upon said face to exert uniform pressure upon the piston ring, said follower ring being split transversely from outer edge to inner edge.

4. A piston ring and follower assembly comprising a piston ring having one face beveled and the opposite face flat and having a flat inner face connecting said flat and beveled faces, and an inclined substantially frusto-conical thin follower ring bearing upon said flat face of the piston ring at the outer circumference of the follower ring and having the inner circumference extending inwardly beyond said flat inner face of said piston ring, said follower being split transversely from outer edge to inner edge and being adapted to be distorted by pressure against said inner circumference to be compressed against said piston ring.

5. A piston having a ring groove provided with a beveled wall, a piston ring fitting in said groove having a beveled face engaging said beveled wall and having a step joint including overlapping tongues longitudinally across which said beveled face passes to form a seal against said beveled wall of the ring groove, and a thin substantially frusto-conical cast iron follower ring split transversely therethrough from inner edge to outer edge, said follower ring being axially compressible against one wall of said ring groove and against one face of said piston ring to force the beveled face of the piston ring against the beveled wall of said ring groove.

6. A piston having a ring groove provided with a beveled wall, a piston ring fitting in said groove having a beveled face engaging said beveled wall and having a step joint including overlapping tongues longitudinally across which said beveled face passes to form a seal against said beveled wall of the ring groove, and a thin frusto-conical cast iron follower ring in said ring groove engaging one face of said groove at a plurality of points and adapted to be axially compressed against one face of said piston ring to exert uniform pressure endwise against the piston ring to hold said beveled face of the piston ring against the beveled wall of the ring groove, said follower ring being split transversely therethrough from inner edge to outer edge to impart resiliency to the ring.

In testimony whereof I affix my signature.

JUDSON WILLIAMS. [L. S.]